US010575160B2

(12) United States Patent
Goodman (10) Patent No.: US 10,575,160 B2
(45) Date of Patent: Feb. 25, 2020

(54) SYSTEMS AND METHODS FOR OPERATING DISPLAY DEVICES WITH DUAL PATHWAY CONNECTIONS

(71) Applicant: vitroTV Corporation, Austin, TX (US)

(72) Inventor: David H. Goodman, Austin, TX (US)

(73) Assignee: VITROTV HK LTD, Central (HK)

( * ) Notice: Subject to any disclaimer, the term of this patent is extended or adjusted under 35 U.S.C. 154(b) by 404 days.

(21) Appl. No.: 15/441,171

(22) Filed: Feb. 23, 2017

(65) Prior Publication Data

US 2017/0289782 A1 Oct. 5, 2017

Related U.S. Application Data

(60) Provisional application No. 62/315,359, filed on Mar. 30, 2016.

(51) Int. Cl.
| | |
|---|---|
| *G06F 15/16* | (2006.01) |
| *H04W 4/90* | (2018.01) |
| *H04L 12/58* | (2006.01) |
| *G06F 3/14* | (2006.01) |
| *H04L 29/06* | (2006.01) |
| *H04L 12/721* | (2013.01) |
| *H04W 88/06* | (2009.01) |
| *H04L 12/715* | (2013.01) |

(52) U.S. Cl.
CPC ............ *H04W 4/90* (2018.02); *G06F 3/1431* (2013.01); *H04L 45/34* (2013.01); *H04L 51/26* (2013.01); *H04L 69/14* (2013.01); *G09G 2330/08* (2013.01); *G09G 2352/00* (2013.01); *G09G 2370/022* (2013.01); *H04L 45/04* (2013.01); *H04W 88/06* (2013.01)

(58) Field of Classification Search
CPC ......... H04L 45/34; H04L 51/26; H04L 69/14; H04L 45/04; H04W 4/90
USPC .......................................................... 709/206
See application file for complete search history.

(56) References Cited

U.S. PATENT DOCUMENTS

| | | | |
|---|---|---|---|
| 6,374,099 B1 | 4/2002 | Bi et al. | |
| 6,405,049 B2 | 6/2002 | Herrod et al. | |
| 7,653,689 B1 * | 1/2010 | Champagne | H04N 21/2402 709/203 |
| 8,145,182 B2 | 3/2012 | Rudolf et al. | |
| 8,340,711 B1 * | 12/2012 | Glass | H04W 4/90 455/552.1 |
| 8,364,148 B2 | 1/2013 | Dravida et al. | |
| 8,626,842 B2 * | 1/2014 | Onda | G06F 21/10 709/206 |
| 9,009,218 B2 * | 4/2015 | Chen | H04L 29/08846 709/203 |
| 2003/0093545 A1 * | 5/2003 | Liu | H04L 29/06 709/231 |
| 2003/0123465 A1 * | 7/2003 | Donahue | H04L 45/02 370/401 |
| 2003/0167315 A1 * | 9/2003 | Chowdhry | H04L 67/02 709/218 |
| 2006/0084502 A1 * | 4/2006 | Downs, III | G07F 17/32 463/29 |
| 2006/0184614 A1 * | 8/2006 | Baratto | G06F 3/14 709/203 |

(Continued)

*Primary Examiner* — Razu A Miah
(74) *Attorney, Agent, or Firm* — Pierson IP, PLLC (57) ABSTRACT

A display devices with dual pathway connections. More particularly, electronic signage devices with dual or redundant pathways offering lower cost and higher reliability.

18 Claims, 3 Drawing Sheets

(56) References Cited

U.S. PATENT DOCUMENTS

| | | | |
|---|---|---|---|
| 2006/0268756 A1 | 11/2006 | Wang et al. | |
| 2006/0268902 A1 | 11/2006 | Bonner | |
| 2007/0256135 A1 | 11/2007 | Doradla et al. | |
| 2008/0114862 A1* | 5/2008 | Moghaddam | H04L 63/0245 709/220 |
| 2010/0030883 A1* | 2/2010 | Kiefer | H04L 41/00 709/223 |
| 2010/0057563 A1* | 3/2010 | Rauber | G06Q 30/02 705/14.53 |
| 2010/0169464 A1* | 7/2010 | Grandy | G06Q 30/0241 709/219 |
| 2010/0271951 A1* | 10/2010 | Dujardin | H04L 63/0272 370/241 |
| 2011/0012811 A1* | 1/2011 | Miyazaki | G06F 3/1431 345/1.1 |
| 2011/0105159 A1* | 5/2011 | Hirayama | G06F 3/147 455/466 |
| 2011/0153754 A1* | 6/2011 | Gunasekara | G10L 13/00 709/206 |
| 2012/0011194 A1* | 1/2012 | Tahan | G06F 3/0481 709/203 |
| 2012/0166561 A1* | 6/2012 | Kelly | G06F 9/00 709/206 |
| 2012/0215834 A1* | 8/2012 | Chen | H04L 29/08846 709/203 |
| 2014/0006451 A1 | 1/2014 | Mullis et al. | |
| 2014/0280657 A1* | 9/2014 | Miller | H04L 51/26 709/207 |
| 2015/0215786 A1 | 6/2015 | Raleigh | |
| 2015/0201001 A1* | 7/2015 | Cabanillas | G06Q 50/01 709/203 |
| 2016/0255024 A1* | 9/2016 | Tichauer | H04L 51/24 709/206 |

* cited by examiner

SYSTEMS AND METHODS FOR OPERATING DISPLAY DEVICES WITH DUAL PATHWAY CONNECTIONS

CROSS-REFERENCE TO RELATED APPLICATIONS

This application claims a benefit of priority under 35 U.S.C. § 119 to Provisional Application No. 62/315,359 filed on Mar. 30, 2016 which is fully incorporated herein by reference in its entirety.

BACKGROUND INFORMATION

Field of the Disclosure

Examples of the present disclosure are related to systems and methods for operating display devices with dual pathway connections. More particularly, embodiments disclose electronic signage devices with dual or redundant pathways offering lower cost and higher reliability.

Background

Schools, hospitals, commercial businesses, cafeterias, etc. have relied on printed signage, posters, and permanent kiosks to offer information to direct and induce behavior. Advances in technology have created new channels and means to present information to people via electronic display devices. Changing or updating the content on conventional electronic display devices is commonly done locally at the electronic display device. These updates of series of static graphics onto the electronic display device may be performed utilizing a local Wi-Fi connection or a movable storage device to downloaded content.

However, conventional display devices are difficult manage because they require a user to manually and locally update the static graphics to be displayed. Additionally, at times there may be network connectivity issues that do not allow the display devices to be updated. More so, Wi-Fi protocols are insecure connections that can be hacked or broken by a reset of routers, changes in firewall protocols, or a number of other types of interferences.

To this end, if the Wi-Fi connection is down, a conventional electronic display device may be rendered inoperable. Also, due to the nature of connectivity firewalls and other security measures, outside access to conventional electronic display devices is prohibited. Yet, situations may arise where third parties require access to the display device to manage emergency situations, such as weather events, fire, police action, and other types of unforeseen events or disasters.

Accordingly, needs exist for more effective and efficient systems and methods for electronic signage devices with dual or redundant pathways offering lower cost and higher reliability.

SUMMARY

Embodiments described herein disclose systems and methods for electronic signage devices with dual or redundant pathways that offer lower cost and higher reliability. Embodiments may include a thin-client display that is configured to have dual path connectivity via a wide area network and a local area network.

Systems for managing a network of digital displays with dual connectivity paths may include local, public networks (Wi-Fi, Ethernet, Bluetooth, etc.) and wide area, secure private networks (CDMA, GSM, and other digital networks operated by cell phone providers, etc.)

The local area network may require a thin client display device to have network credentials to log onto the local area network. The local area network may be utilized to receive local content, advertising content, and remote content.

The wide area network may be configured to permit an automatic registration with a display device when the display device is powered on. Critical content from secured third parties, such as local, state, and federal institutions, may be transmitted over the wide area network or a content management system.

Embodiments may include a content management server configured to control a plurality of thin-client display devices. The content management server may be configured transmit data to each of the thin-client display devices, and record the technical state of each of the display devices at various times, determine the cycle of content presented on each of the display devices, store the activity of content presented on each of the display devices, and communicate the activity at intervals to a hosted database.

In embodiments, the thin-client electronic display may be configured to automatically register with a wide area network responsive to being initiated to determine if there are any priority messages to display. If there is a priority message, the thin-client display may display content associated with the priority message.

If there is not a priority message received over the wide area network, then the thin-client electronic display may be configured to register with a local area network. The thin-client may then download content for display, and may cycle through the content based on a schedule. During the cycle, the thin-client display may poll the wide area network at regular intervals to determine if there is a priority message to be displayed. At the end of the schedule for presenting the content, the thin-client display may turn off while continuing to poll for a priority message over the wide area network. If there is a priority message received over the wide area network, the thin-client may automatically turn on, and display content associated with the priority message.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments described herein disclose systems and methods for electronic signage devices with dual or redundant pathways offering lower cost and higher reliability. Embodiments may include a thin-client display that is configured to have dual path connectivity via a wide area network and a local area network. The thin client may automatically first register with a first type of network to determine if there are any priority messages from a predetermined, closed/predetermined list of users/sources, each being associated with a different unique identifier. If there is a priority message received over the first type of network, the thin-client may present content associated with the received priority message. If there are no priority messages, the thin-client may be configured to automatically log into a second type of network, present information received content over the second type of network, and poll for priority messages received over the first type of network at predetermined intervals.

Figure 1:
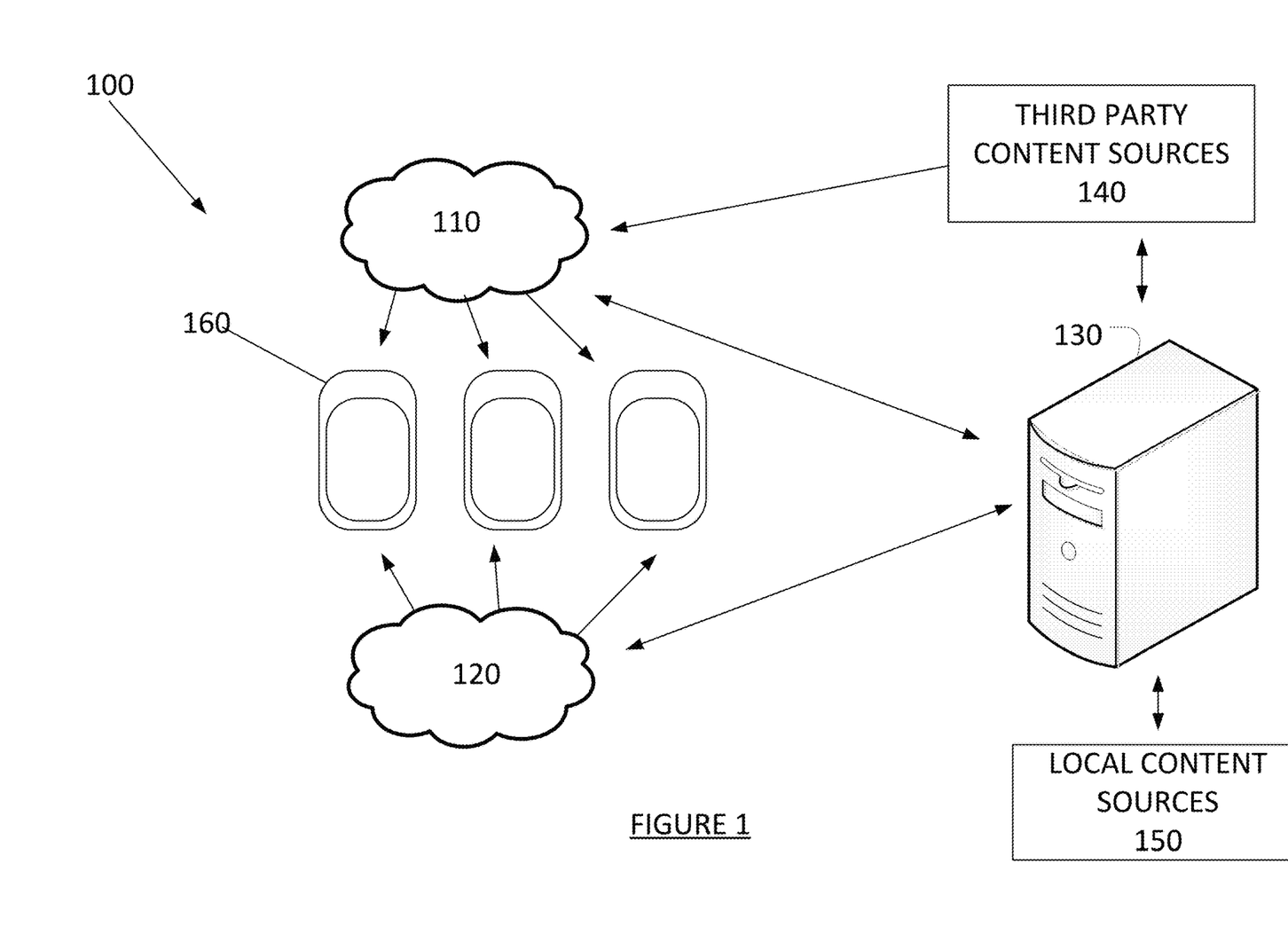
FIG. 1 depicts a topology for content display system, according to an embodiment.

Turning now to FIG. 1, FIG. 1 depicts a topology for content display system 100. System 100 may include a first type of network 110, a second type of network 120, a content management server 130, third party content sources 140, local content sources 150, and thin-client display devices 160.

First type of network 110 may be a wide area network (WAN) that extends over a large geographical distance. First type of network 110 may be a wireless communications network, digital radio, or cellular network operating over CDMA, GSM, etc. First type of network 110 may be operated by telecommunications providers. In embodiments, first type of network 110 may allow for a higher reliability of data communications than second type of network 120. However, transmitting data over first type of network 110 may have a higher cost associated with transmitting data over second type of network 120. It will be understood that network 110 may be a combination of multiple different kinds of wired or wireless networks operating over a first network protocol.

Second type of network 120 may be a wireless local area network (WLAN) or local area network (LAN) that is configured to link two or more devices within a limited area, such as a home, school, commercial building, office building, etc. For example, second type of network 120 may be a Wi-Fi network. Second type of network 120 may be configured to allow for data transmission over a closed loop network by users with network credentials. In embodiments, second type of network 120 may have a lower cost associated with transmitting data than first type of network 110, and second type of network 120 may be able to communicate data at higher speeds and with more bandwidth than first type of network 110. It will be understood that second type of network 120 may be a combination of multiple different kinds of wired or wireless networks operating over a second network protocol.

Content management server 130 may be a computing device, such as a general hardware platform server configured to support mobile applications, software, content, and the like executed on thin-client display devices 160. Content management server 130 may include physical computing devices residing at a particular location or may be deployed in a cloud computing network environment. In this description, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Content management server 130 may include any combination of one or more computer-usable or computer-readable content.

Content management server 130 may be configured to communicate content, audio data, video data, etc. (referred to hereinafter individually and collectively as "content") over first type of network 110 and second type of network 120. The content may be received from third party content sources 140 and/or local content sources 150. Content management server 130 may be configured to transmit content over first type of network 110 or second type of network 120, wherein the content is configured to be presented on thin-client display 160.

Furthermore, content management server 130 may be configured to schedule of cycle the presentation of the content on thin-client display 160. Content management server 130 may be configured to store attribute information associated with each thin-client display device 160 indicating the physical and internet location of a thin-client display device 160, the content currently displayed at each thin-client display device 160, a history of the content presented at each thin-client display device 160, a schedule of content to be presented on each thin-client display device 160, network credentials associated with second type of network 120, phone number or other unique identifiers identifying sources to receive content from third party content sources 140 and transmit content over first type of network 110, etc.

Third party content sources 140 may be any form of computing device with a hardware processor that is configured to process instructions and communicate content and data to first type of network 110 and/or between content management server 130. Third party content sources 140 may be associated with local, state, and federal institutions, such as fire departments, police departments, and other emergency personnel. Third party content sources 140 may be configured to transmit content to be presented on thin-client displays devices 160, wherein the content is transmitted directly to the thin-client display devices 160 via first type of network 110.

Alternatively, third party content sources 140 may be configured to transmit content to be presented on thin-client display device 160 by transmitting the content to content management server 130. In embodiments, the content transmitted by third party content sources 140 over network 110 may be sent as priority messages from a closed group. The priority messages may include content to be displayed on thin client device 110, along with scheduling information and a source identifier. The scheduling information may indicate when and where the content should be displayed on thin-client display devices 140. The source identifier may identify the source of the content from third party content sources 140, wherein the source identifier may be compared with a list of unique identifiers for third party content sources 140 stored on a database of content management server 130 and/or thin client devices 160. The list of unique identifiers may be IP addresses, phone numbers, fax numbers, MAC addresses, etc. Responsive to comparing and matching a unique identifier associated with a third party content source 140, the content may be transmitted by content management server 130 and/or be downloaded by a thin-client display device 160.

Local area content sources 150 may be any form of computing device with a hardware processor that is configured to process instructions and communicate content and data over first type of network 110, second type of network 120, and/or between content management server 130. Local area content sources 150 may be configured to transmit content associated with locally developed content, advertising content, and remote content developed by a site owner, such as a franchise owner, state agency, school, district, national agency, etc. Local area content sources 150 may be configured to transmit content to be presented on thin-client display devices 160 on a schedule or cycle. In embodiments, local area content sources 150 may be configured to transmit content to be presented on thin-client displays devices 160 to the thin-client display devices 160 via second type of network 120. In other embodiments, local area content sources 150 may be configured to transmit content to be presented on thin-client display device 160 by first transmitting the content directly to content management server 130, which may transmit the content over first type of network 110 and/or second type of network 120. As such, local area content sources 150 may not be configured to transmit content over first type of network 110 and/or directly to thin-client display devices 160 over network 110. In embodiments, local content sources 150 may also include third party content sources 140.

Thin-client display devices 160 may be lightweight computing and display devices that are configured to remote into content management server 130, and present content to users. Thin-client display device 160 may rely on content management server 130 for processing. Thin-client display devices 160 may be configured to communicate and receive data and content over dual pathways, first type of network 110 and second type of network 120. By utilizing dual pathways for communications, the risk of network connectivity errors may be mitigated, reduced, limited, etc. while also conserving bandwidth over first type of network 110 and/or second type of network 120.

Figure 2:
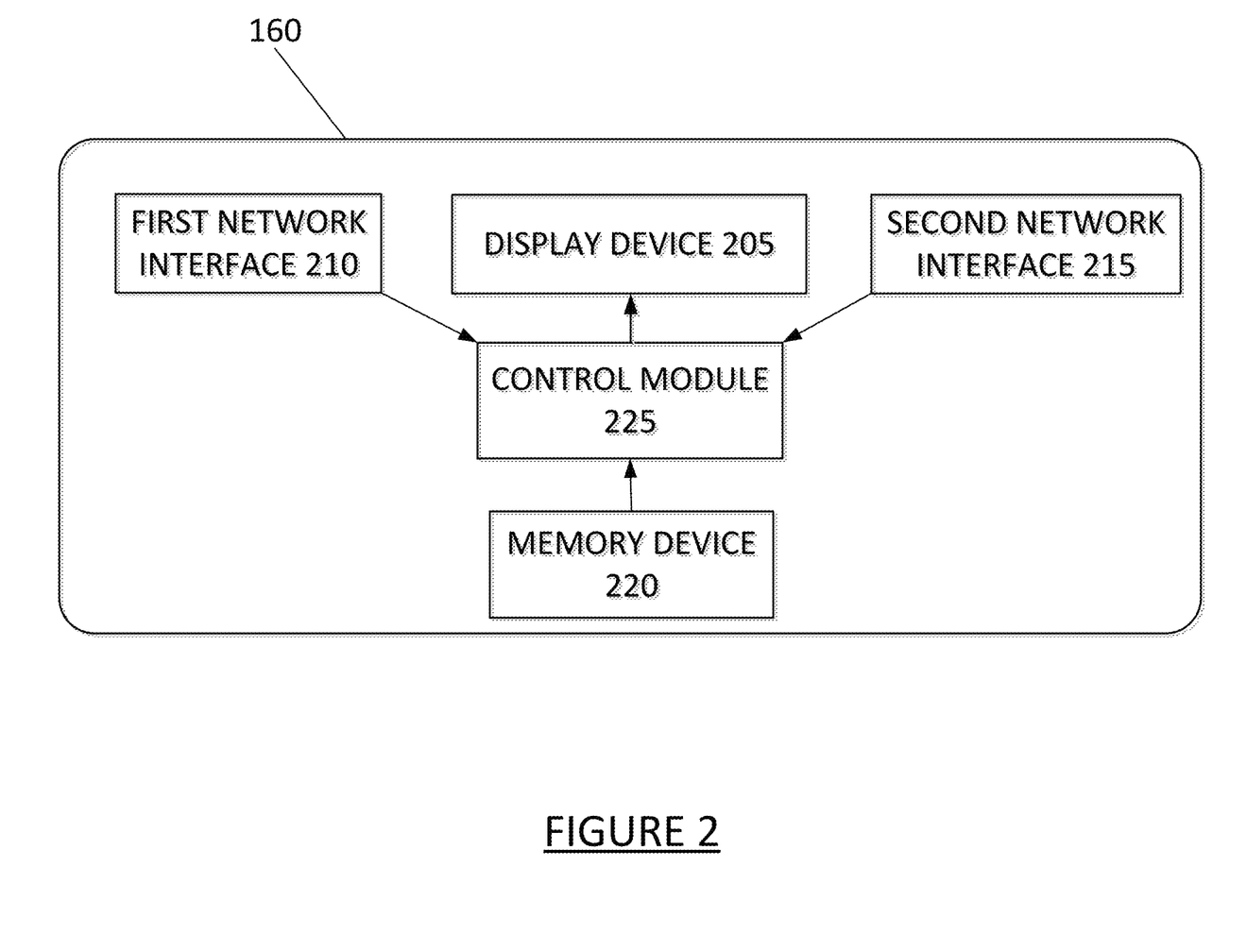
FIG. 2 depicts a thin-client display device, according to an embodiment.

Turning now to FIG. 2, FIG. 2 depicts one embodiment of thin-client display devices 160. Thin-client display devices 160 may include a display device 205, first network interface 210, second network interface 215, memory device 220, and control module 225.

Display device 205 may be a monitor comprising a display, circuitry, casing, audio outputs, and a power supply. For example, display device may include LED displays, film transistor liquid crystal displays, organic light-emitting diode displays, etc. Display device 205 may be configured to present media received by thin-client display device 160 to users.

First network interface 210 may be a communications device that allows thin-client display device 160 to communicate content and data over first type of network 110. First network interface 210 may include one or more wireless transceivers for performing wireless communication and/or one or more communication ports for performing wired communication. In implementations, First network interface 210 may be configured to communicate data over a plurality of different standards and/or protocols. First network interface 210 may be configured to allow thin-client display device 160 to log onto a first type of network 110. The thin-client display device 160 may automatically log onto the first type of network 110 upon being initialized, at a predetermined time during an operation cycle, or any other scheduled time. For example, at 8:00 AM on Monday through Fridays, the thin-client display device 160 may log onto the first type of network 110. Responsive to being logged onto the first type of network 110, first network interface 210 may be configured to receive priority messages from third party content sources 140, which may have been transmitted while think-client display device 160 was offline. Alternatively, thin-client display device 160 may operate in a low power mode, and be configured to poll first type of network 110 for priority messages from third party content sources 140. Responsive to receiving a priority message, thin-client display device 160 may no longer operate in the low power mode. The priority message may also include timing data, indicating how long the media associated with the priority message should be presented on the thin-client display device 160. First network interface 210 may enable content to be received directly from a third party content source 140 and/or relayed through content management server 130. If content is relayed through content management server 130 from third party content sources 130, the content may retain a unique identifier associated with a corresponding third party content source 140.

Second network interface 215 may be a communications device that allows thin-client display device 160 to communicate content and data over second type of network 120. Second network interface 215 may include one or more wireless transceivers for performing wireless communication and/or one or more communication ports for performing wired communication. In implementations, Second network interface 215 may be configured to communicate data over a plurality of different standards and/or protocols. In embodiments, second network interface 215 may be configured to download network credentials to log onto the second type of network 120. The network credentials for the second type of network 120 may be stored locally within the memory device 220 or may be downloaded, updated, etc. via the first type of network. Second network interface 215 may be configured to allow may thin-client display device 160 log onto the second type of network 120 responsive to downloading the network credentials for the second type of network 120. Responsive to logging into the second type of network 120, second network interface 215 may be configured download content associated with local content sources to be presented on display device 205.

Memory device 220 may be a device that stores data generated or received by thin-client display device 160. Memory device 220 may include, but is not limited to a hard disc drive, an optical disc drive, and/or a flash memory drive. In embodiments, memory device 220 may be configured to store information received from content management server 130, first type of network 110, and/or second type of network 120. For example, memory device 220 may store data associated with network credentials for the second type of network 120, which may allow thin-client display device 160 to log onto second type of network 220. Memory device 220 may also include a database of unique identifiers associated with third party content sources 140, which may thin-client display device 160 to receive content from third party content sources 140 with a corresponding unique identifier. For example, the database may include IP addresses, phone numbers, fax numbers, MAC addresses, etc. associated with different third party content sources 140. Responsive to receiving content from a content source over first type of network 110 that does not have a matching unique identifier within the database, thin-client display device may not present the content on display device 205.

Control module 225 may be a hardware processing device including memory, e.g., read only memory (ROM) and random access memory (RAM), storing processor-executable instructions and one or more processors that execute the processor-executable instructions. Processing device 205 may execute an operating system of thin-client display device 160 or software associated with other elements of thin-client display device 160. For example, control module 225 may include a power control module configured to control the power settings of thin-client display device, admin control module configured to control security setting of thin-client display device 160 that may allow thin-client display device 160 to connect to a second type of network 120, and a history module configured to store data associated with content presented on the display device 205.

Figure 3:
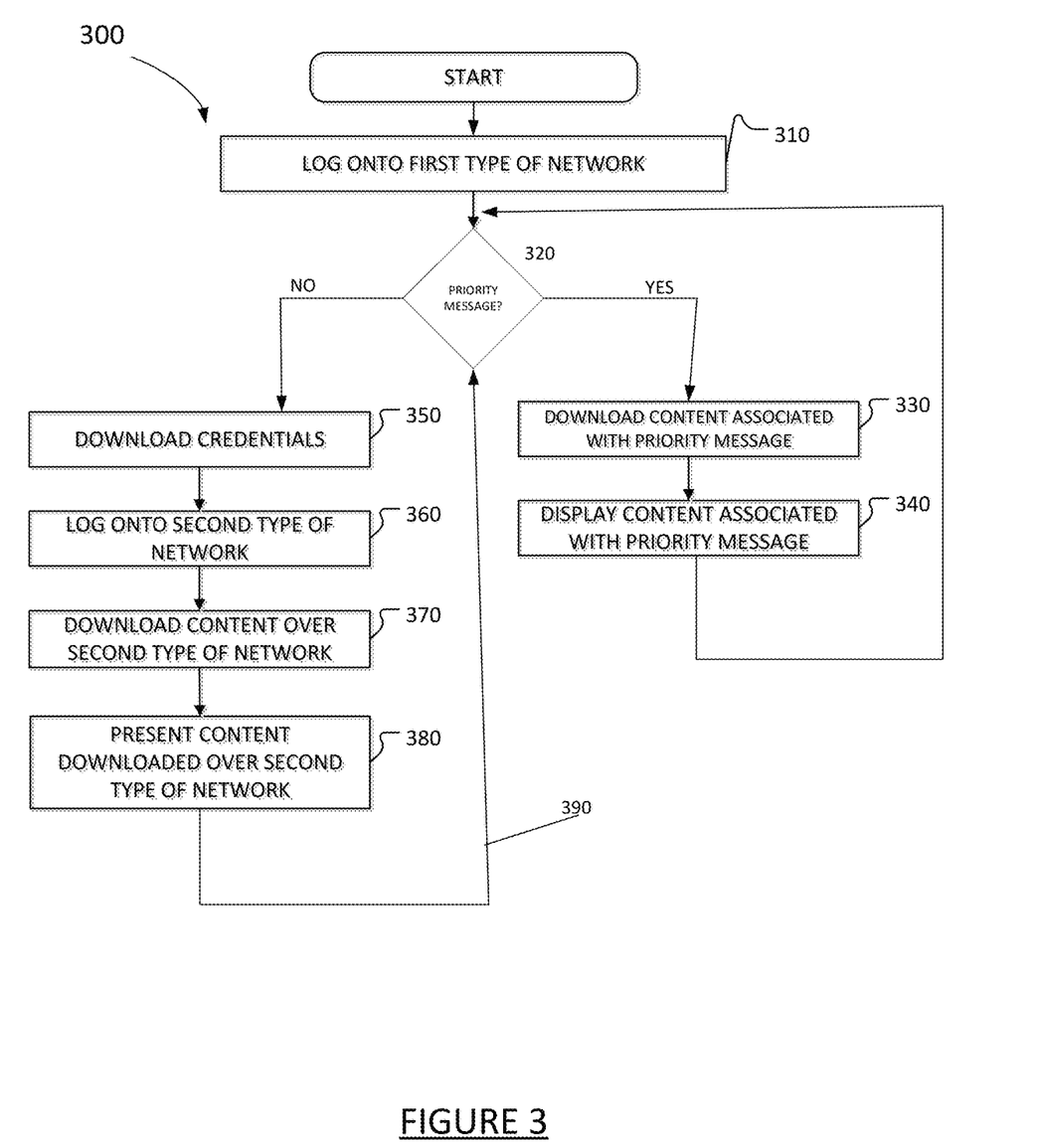
FIG. 3 depicts a method for operating display devices with dual pathway connections, according to an embodiment.

FIG. 3 illustrates a method 300 for operating display devices with dual pathway connections. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a solid-state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At operation 310, after a power down, reset, or being initialized, a thin-client display device may automatically log onto a first type of network. The thin-client display device may log onto the first type of network upon being initialized, at a predetermined time during an operation cycle, or any other scheduled time. For example, at 8:00 AM on Monday through Fridays, the thin-client display device may log onto the first type of network.

At operation 320, the thin-client may determine if there is a priority message to be received over the first type of network.

At operation 330, responsive to the thin-client determining that there is a priority message to be received over the first type of network at operation 320, the thin-client may download content and other data associated with the priority message over the first type of network. For example, a priority message may be received over the first type of network from a weather station indicating a weather warning in the near future. Accordingly, information associated with the weather warning may be automatically downloaded. In further embodiments, the thin client display device may receive a unique identifier associated with the priority message. The thin-client may determine if the received unique identifier matches a locally stored unique identifier.

At operation 340, the content associated with the priority message may be presented on the thin-client. The priority message may also include timing data, indicating how long the content associated with the priority message should be presented on the thin-client. After presenting the content associated with the priority message for the predetermined time, the method may return to operation 320.

At operation 350, responsive to determined that there are no priority messages received over the first type of network at operation 330, the thin-client may download network credentials to log onto the second type of network. In embodiments, the network credentials for the second type of network may be stored locally within the thin-client or may be downloaded, updated, etc. via the first type of network.

At operation 360, the thin-client may log onto the second type of network responsive to downloading the network credentials for the second type of network.

At operation 370, the thin-client may download content associated with local content to be presented on the thin-client. In embodiments, the downloaded content may be stored within a storage medium located on the thin-client, which may limit the amount of bandwidth used by the thin client over the first type of network or the second type of network.

At operation 380, the content may be presented on the thin-client based on a schedule. The schedule may be determined on a plurality of factors that may be different or the same for each article of content. For example, the thin-client may be configured to display content between 8:00 AM and 6:00 PM Monday through Fridays, and may not be configured to display content on the weekends. The content presented may be cycled through during the schedule, wherein certain articles of content may be presented in the mornings, evening, or both.

Operation 390, the thin-client may poll the wide area network for priority messages. The polling may occur at predetermined intervals, which may be any desired length of time. The thin-client may also be configured to poll the wide area network for priority messages while the content is being presented on the thin client. Additionally, the thin client may be configured to receive priority messages after the cycle of content and also if the display is turned off. If the thin-client receives a priority message, the display may be turned on to display the content associated with the priority message. In other embodiments, the wide area network may be configured to push the priority messages to the thin-client.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable content may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagrams.

What is claimed is:

1. A system for utilizing a plurality of thin-clients for presenting content, the system comprising:

a first network interface configured to allow the plurality of thin-clients to receive data over a first type of physical network, the first type of network being a cellular network;

a second network interface configured to allow the plurality of thin-clients to receive data over a second type of physical network, the second type of physical network being a local area network connected to the internet;

a control module configured to automatically log the plurality of thin-clients onto the first type of physical network to determine if there is a priority message to be received over the first type of physical network before logging into the second type of physical network, and downloading the priority message if there priority message is downloadable over the first type of physical network, and to log the plurality of thin-clients onto the second type of physical network responsive to determining that there are no priority messages to be received, the priority message including content data and a unique identifier, the control module being configured to download second content over the second type of physical network after determining that there are no priority messages to be received over the first type of physical network, the second content being independent from the priority message;

a display to present the content associated with the priority message; wherein the plurality of thin-clients are controlled by a content management server, the content management server being configured to transmit data to each of the plurality of thin-clients, and record a technical state of each of the plurality of thin-clients at various times, and determine a cycle of content presented on each of the plurality of thin-clients.

2. The system of claim 1, further comprising:
a third party content source associated with an emergency service, wherein the third party content source transmits the priority message over the first type of physical network.

3. The system of claim 1,
wherein the content management server is configured to receive the priority message from a third party content source, and transmit the priority message over the first type of physical network.

4. The system of claim 1, further comprising:
a memory device configured to store unique identifiers associated with third party content sources, wherein responsive to receiving the priority message it is determined if the unique identifier associated with the priority message is stored within the memory device.

5. The system of claim 1,
wherein the content management server is configured to receive the content from content providers, and the content management server being configured to transmit the content over the second type of physical network.

6. The system of claim 1, wherein the content is configured to be presented on the display based on a schedule.

7. The system of claim 1, wherein a first thin-client of the plurality of thin-clients is configured to receive network credentials to log into the second type of physical network over the first type of physical network.

8. The system of claim 1, wherein a first thin-client of the plurality of thin-clients is configured to poll the first type of physical network for priority messages in a low power mode.

9. The system of claim 1, wherein the second type of physical network is a closed loop internet.

10. A method for utilizing a plurality of thin-clients for presenting content, the method comprising:
- receiving data over a first network interface, the first type of physical network being a cellular network;
- receiving data over a second type of network, the second type of physical network being a local area network connected to the internet;
- automatically log the plurality of thin-clients onto the first type of physical network to determine if there is a priority message to be received over the first type of physical network before logging into the second type of physical network;
- downloading the priority message over the first type of physical network if there priority message is downloadable, and to log the plurality of thin-clients onto the second type of physical network responsive to determining that there are no priority messages to be received, the priority message including content data and a unique identifier;
- determining that there are no priority messages to be received over the first type of physical network;
- downloading second content over the second type of physical network after determining that there are no priority messages to be received, the second content being independent from the priority message;
- presenting the content associated with the priority message;
- controlling, by a content management server, the plurality of thin-clients,
- transmitting, by the content management server, data to each of the plurality of thin-clients;
- recording, by the content management server, a technical state of each of the plurality of thin-clients at various times; and
- determining, by the content management server, a cycle of content presented on each of the plurality of thin-clients.

11. The method of claim 10, further comprising:
receiving from a third party content source the priority message over the first type of physical network, the third party content source being associated with an emergency service.

12. The method of claim 10, further comprising:
receiving, by the content management server, the priority message from a third party content source; and
transmitting, by the content management server, the priority message over the first type of physical network to the plurality of thin-clients.

13. The method of claim 10, further comprising:
storing, within a memory device, unique identifiers associated with third party content sources, responsive to receiving the priority message determining if the unique identifier associated with the priority message is stored within the memory device.

14. The method of claim 10, further comprising:
receiving, at the content management server, content from content providers; and
transmitting, by the content management server, the content to the plurality of thin-clients over the second type of physical network.

15. The method of claim 10, further comprising:
presenting the content on the display based on a schedule.

16. The method of claim 10, further comprising:
receiving network credentials to log into the second type of network over the first type of physical network.

17. The method of claim 10, further comprising:
polling the first type of network for priority messages in a low power mode.

18. The method of claim 10, wherein the second type of physical network is a closed loop internet.

* * * * *